US012675114B2

(12) United States Patent
Monast et al.

(10) Patent No.: US 12,675,114 B2
(45) Date of Patent: Jul. 7, 2026

(54) METHODS AND APPARATUS FOR SUBTERRANEAN MARKER GUIDANCE

(71) Applicant: The Boeing Company, Arlington, VA (US)

(72) Inventors: Jason Peter Monast, Summerfield, FL (US); Michael Alex Ingerman, Somerville, MA (US)

(73) Assignee: The Boeing Company, Arlington, VA (US)

( * ) Notice: Subject to any disclaimer, the term of this patent is extended or adjusted under 35 U.S.C. 154(b) by 196 days.

(21) Appl. No.: 18/605,341

(22) Filed: Mar. 14, 2024

(65) Prior Publication Data

US 2025/0291349 A1 Sep. 18, 2025

(51) Int. Cl.
*G05D 1/247* (2024.01)
*G05D 109/10* (2024.01)
*G05D 109/20* (2024.01)

(52) U.S. Cl.
CPC ......... *G05D 1/247* (2024.01); *G05D 2109/10* (2024.01); *G05D 2109/20* (2024.01)

(58) Field of Classification Search
CPC . G05D 1/247; G05D 2109/20; G05D 2109/10
See application file for complete search history.

(56) References Cited

FOREIGN PATENT DOCUMENTS

WO WO-2022010684 A1 * 1/2022 ........... G05D 1/2297

* cited by examiner

*Primary Examiner* — Michael D Lang
(74) *Attorney, Agent, or Firm* — Hanley, Flight & Zimmerman, LLC

(57) ABSTRACT

Methods and apparatus for subterranean guidance are disclosed. A disclosed apparatus to guide a vehicle includes interface circuitry communicatively coupled to a ground penetrating sensor supported by the vehicle, machine-readable instructions, and at least one processor circuit to be programmed by the machine-readable instructions to calculate, based on output from the ground penetrating sensor, a position of the vehicle relative to a subterranean marker, and guide movement of the vehicle at least partially based on the position of the vehicle relative to the subterranean marker.

20 Claims, 8 Drawing Sheets

500

START

GUIDE VEHICLE TO THRESHOLD DISTANCE OF LANDING AREA — 501

DETERMINE PRESENCE OF SUBTERREANEAN MARKER(S) — 502

DETERMINE PATTERN — 504

DETERMINE RELATIVE POSITION AND/OR ORIENTATION — 505

DETERMINE PATHWAY — 506

GUIDE VEHICLE/PERFORM AUTONOMOUS ACTION(S) — 508

REPEAT THE PROCESS? — 510

YES

NO

END

METHODS AND APPARATUS FOR SUBTERRANEAN MARKER GUIDANCE

FIELD OF THE DISCLOSURE

This disclosure relates generally to vehicle guidance and, more particularly, to methods and apparatus for subterranean marker guidance.

BACKGROUND

Current aircraft ground navigation technology utilizes global positioning system (GPS) maps in combination with vision-based sensors for aircraft navigation throughout taxiways and runways. However, airport infrastructure (e.g., signs, road markers, etc.) can degrade due to weather or other factors, thereby reducing a visibility/detectability thereof. Further, construction and maintenance of conventional airport infrastructure can be relatively high in cost and take a significant amount of time to construct.

Ground-based vehicles, such as automobiles, trucks, hovercraft, etc., can experience reduced GPS signals (e.g., in areas with relatively tall structures/buildings, certain weather conditions, etc.). Further, some ground-based vehicles have been utilizing autonomous guidance systems to an increasing degree in recent years. However, these autonomous guidance systems can rely on sensors that can experience reduced performance in certain scenarios (e.g., visual sensors with fog, obstructions, etc.).

SUMMARY

An example apparatus to guide a vehicle includes interface circuitry communicatively coupled to a ground penetrating sensor supported by the vehicle, machine-readable instructions, and at least one processor circuit to be programmed by the machine-readable instructions to calculate, based on output from the ground penetrating sensor, a position of the vehicle relative to a subterranean marker, and guide movement of the vehicle at least partially based on the position of the vehicle relative to the subterranean marker.

An example non-transitory machine-readable storage medium includes instructions to cause at least one processor circuit to at least calculate, based on output from a ground penetrating sensor carried by a vehicle, a position of the vehicle relative to a subterranean marker, and guide movement of the vehicle or perform an autonomous action based on the position of the vehicle relative to the subterranean marker.

An example method includes calculating, by executing instructions with at least one processor circuit, a position of a vehicle relative to a subterranean marker based on output from a ground penetrating sensor carried by a vehicle, and guiding, by executing instructions with one or more of the at least one processor circuit, movement of the vehicle based on the position of the vehicle relative to the subterranean marker.

Figure 1:
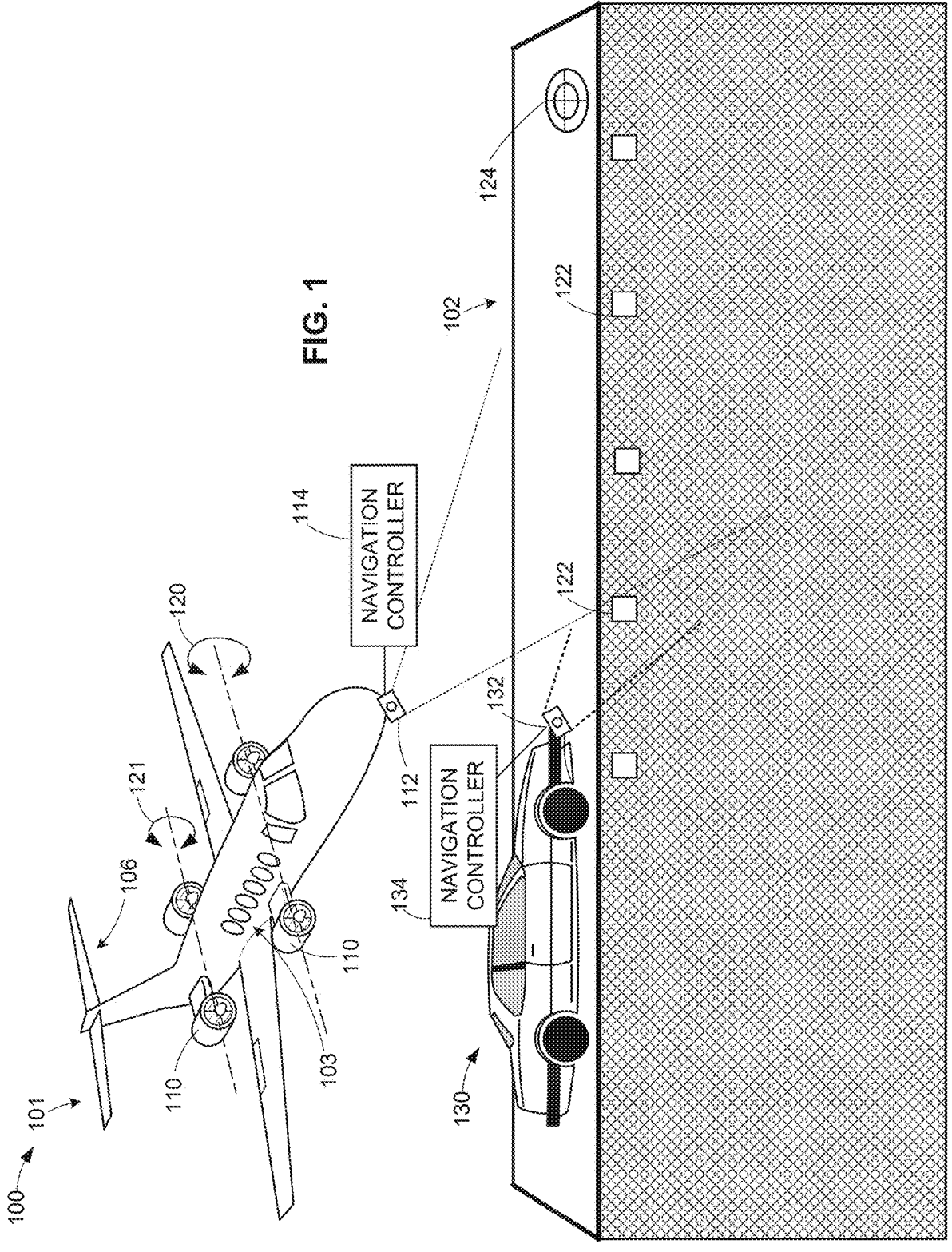
FIG. 1 is an example subterranean marker-based guidance system constructed in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

FIG. 1 is an example subterranean marker-based guidance system 100 constructed in accordance with teachings of this disclosure. The example subterranean marker-based guidance system 100 is implemented to guide a vehicle 101, which is implemented as an aircraft in this example, relative to a ground 102. In this example, the aircraft 101 includes a fuselage 103, a rear/aft portion 106, as well as ducted fans (e.g., ducted fan assemblies) 110. Further, the aircraft 101 includes at least one sensor 112, which is implemented as a ground penetrating radar (GPR) sensor in this example, and a navigation controller 114.

In operation, the aircraft 101 is implemented as a vertical takeoff and landing (VTOL) aircraft such that the aircraft 101 can be switched between a hover mode (e.g., a hovering mode, a takeoff mode, etc.), and a cruise mode (e.g., a primary flight mode, a cruising mode, etc.) by moving, rotating and/or orienting the ducted fans 110. To place the example aircraft 101 in the hover mode or the cruise mode, the ducted fans 110 (and/or an aerodynamic body coupled thereto) can rotate relative to the fuselage 103, as generally indicated by double arrows 120, 121. While the aircraft 101 is a VTOL aircraft in this example, examples disclosed herein can be implemented on any other aircraft including, but not limited to, fixed wing aircraft, short takeoff and landing (STOL) aircraft, rotorcraft, aircraft with fan arrays, autonomous aircraft, etc. Further, examples disclosed herein can be implemented in other types of manned or unmanned vehicles including, but not limited to ground-based vehicles (e.g., automobiles, trucks, jeeps, taxis, sport utility vehicles, vans, buses, motorcycles, trailers, motorhomes), hovercraft, watercraft, submersibles, spacecraft, etc. Examples disclosed herein can guide vehicles and/or cause vehicles to perform autonomous behaviors (e.g., self-flying, self-driving, self-navigating, turning, hovering, etc.) based on subterranean markers 122 that are embedded, hidden and/or buried in the ground 102. The subterranean markers 122 can have a different density and/or material composition (or other characteristic) from other portions of the ground 102.

To identify and/or characterize the subterranean markers 122 that are embedded and/or buried in the ground 102, examples disclosed herein utilize GPR, which is distinct from utilizing visual sensors, as implemented in known systems. The subterranean markers 122 can have a varying density from the ground 102 (e.g., the subterranean markers are at least partially composed of concrete and buried in dirt). Utilization of the subterranean markers 122 in combination with the sensor 112 enables the vehicle 101 to follow a navigational path without necessitating traditional airport infrastructure. Further, examples disclosed herein can reduce and/or eliminate a need for surface infrastructure, thereby enabling runways and taxiways to be set up in a relatively quick and disguised/clandestine manner, which can be particularly advantageous in military applications, or in a quick but not necessarily disguised manner, which can be useful in makeshift or austere runways or landing areas, for example.

To guide the vehicle (e.g., an aircraft) 101 based on the subterranean markers 122, the sensor 112 detects a presence of at least one of the subterranean markers 122. In this example, detection of the aforementioned subterranean marker(s) 122 based on sensor output of the sensor 112 enables the navigation controller 114 to determine, identify and/or discern the pattern and, thus, calculate a relative distance, position, attitude, and/or orientation of the aircraft 101 (e.g., autonomously guide the aircraft 101). In some examples, the aircraft 101 is guided and/or directed to a destination area (e.g., a landing pad, refueling point, a cargo drop off location and/or arrival area/target, etc.) 124 based on the subterranean marker(s) 122. According to some examples disclosed herein, an arrangement and/or spacing of the subterranean marker(s) 122 relative to one another can indicate at least one property and/or characteristic of the destination area 124. In particular, the at least one property and/or characteristic can pertain to, but is not limited to, spatial characteristics, a landing site identifier, a directional indicator, a runway, a path for guidance, a direction for approach, a runway direction and/or orientation, a stop location, a turn location, etc. Examples disclosed herein can also be utilized to guide the vehicle 101 away from the destination area 124. In some examples, a laser altimeter (or similar device) is implemented to evaluate a GPR distance from the ground 102.

In some examples, a ground-based vehicle (e.g., an autonomous ground-based vehicle, a semi-autonomous vehicle, a fully autonomous vehicle, etc.) 130, which may be manned or unmanned, utilizes detection and/or relative positions of the subterranean markers 122 for guidance thereof. In some such examples, the ground-based vehicle 130 includes a sensor 132 and a navigation controller 134. According to some examples disclosed herein, the vehicle 130 can be self-guided/autonomous/semi-autonomous and utilize the subterranean markers 122 by following a path defined by the subterranean markers 122.

According to some examples disclosed herein, the subterranean markers 122 are utilized to identify landing locations/areas, features, paths, pathways, boundaries, refueling locations, turning areas, etc. In some examples, the subterranean markers 122 are utilized for taxiing, dropping off/picking up cargo (e.g., at a cargo drop off station), guidance to a garage and parking, etc. In some applications, the subterranean markers 122 are hidden in the ground (e.g., for military applications, for nonobtrusive landing locations, for autonomous vehicles, etc.). Additionally or alternatively, the subterranean markers 122 are utilized for refueling alignment, navigation and/or guidance.

In some examples, a global navigation satellite system (GNSS), such as a global positioning system (GPS), or other appropriate navigation implementation is utilized in conjunction with GPR detection for relatively high precision localization of the aircraft 101. In particular, examples disclosed herein may be utilized to augment, collaborate with, backup and/or supplement other existing navigation/guidance systems for relatively precise control of the aircraft 101. In some examples, loss and/or interruption of a GNSS signal (or other signal corresponding to guidance/navigation) can cause the aircraft 101 to detect, seek and/or locate the subterranean markers 122.

Figures 2A, 2B:
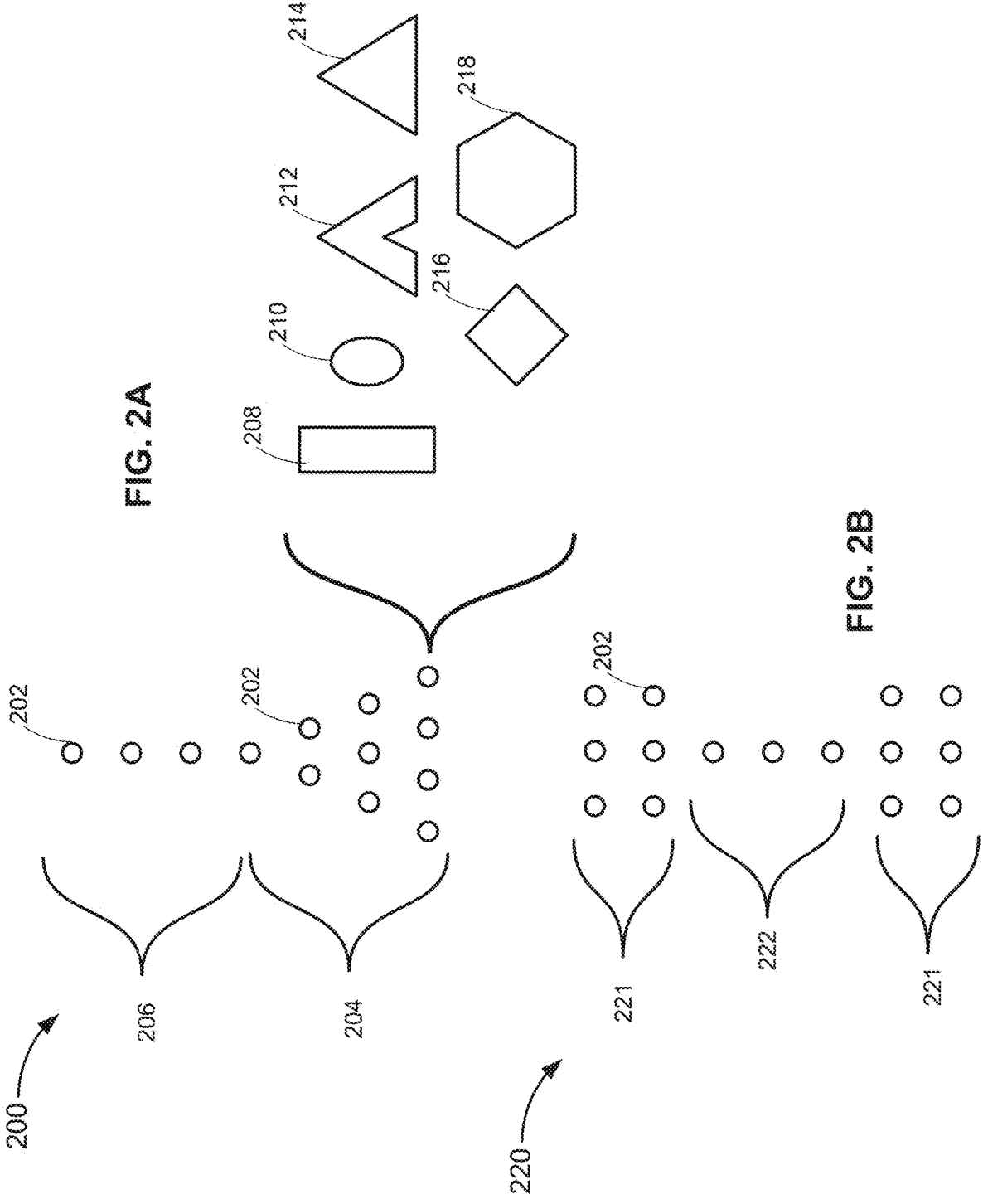
FIGS. 2A and 2B are top views of example marker arrangements that can be implemented with examples disclosed herein.

FIGS. 2A and 2B are top/overhead views of example marker arrangements 200, 220, respectively, that can be implemented with examples disclosed herein. Turning to FIG. 2A, the example arrangement 200 includes a pattern of subterranean markers 202 having a converging portion 204 that converges and/or narrows toward a linear path 206. In this example, a vehicle utilizing GPR detection can utilize the converging portion 204 to be guided toward the linear path 206, for example.

In this example, the markers 202 are generally round and/or cylindrical. However, in other examples, markers can be rectangular shaped, ellipsoid/oval shaped, arrow shaped, triangle shaped, diamond shaped, hexagonal shaped, etc., from an overhead perspective as shown with example markers 208, 210, 212, 214, 216, 218, etc. In some examples, a combination of at least two different shapes is utilized to guide a vehicle (e.g., a triangular marker in combination with a rectangular marker, etc.). Additionally or alternatively, markers of different sizes (e.g., diameters, lateral widths, heights, etc.) are utilized in combination with one another. In some such examples, the different sizes can convey information and/or guidance for navigation.

Turning to FIG. 2B, the example marker arrangement 220 is shown. In this example, the marker arrangement 220 defines a spatial arrangement of the markers 202. The example marking arrangement 220 includes rectangular portions 221 separated by a linear portion 222. In this example, the combination of the rectangular portions 221 along with the linear portion 222 can aid in guidance of a vehicle. Additionally or alternatively, the combination of the rectangular portions 221 along with the linear portion 222 is utilized to guide an orientation and/or heading of a vehicle.

Figures 3A, 3B, 3C, 3D:
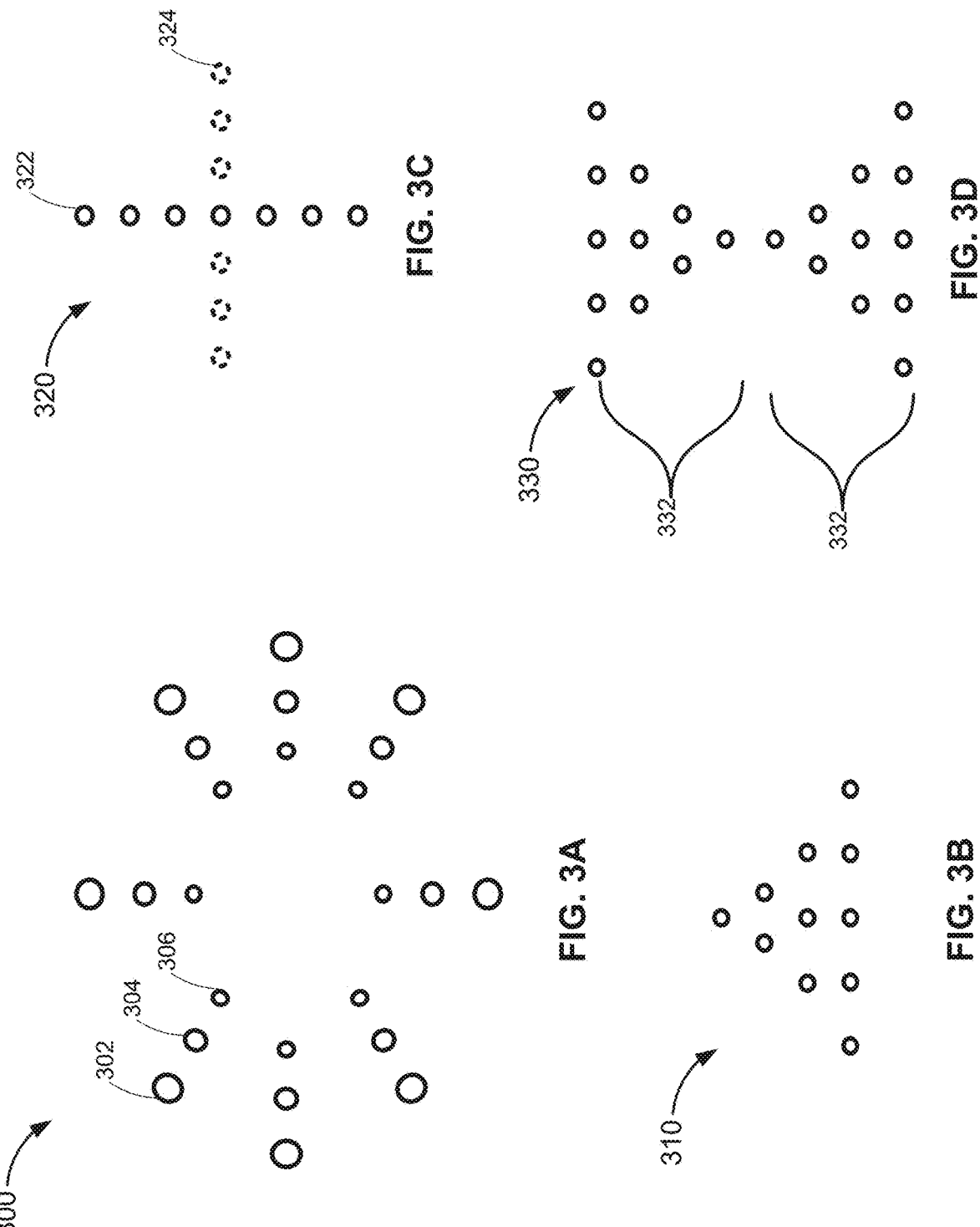
FIGS. 3A-3D are top views of alternative example marker arrangements that can be implemented with examples disclosed herein.

FIGS. 3A-3D are top/overhead views of alternative example marker arrangements 300, 310, 320, 330 that can be implemented in examples disclosed herein. Turning to FIG. 3A, the example marker arrangement 300 is shown with markers 302, 304, 306, each of which have a different size (e.g., increasing diameter) along a radial direction of the marker arrangement 300.

FIG. 3B depicts the example marker arrangement 310. In this example, the marker arrangement 310 is generally triangular shaped. According to examples the disclosed herein, a corner of the marker arrangement 310 may correspond to a location of destination or a landing site/zone/area, for example.

FIG. 3C depicts the example marker arrangement 310 with a line of markers 322 to guide a vehicle (e.g., guide the vehicle to a landing site/zone/area). In some examples, a line of markers 324 is also implemented to define an overall cross-like arrangement of markers. According to some examples disclosed herein, the line of markers 322 and the line of markers 324 can define a reticle or other indicator/guide for an aircraft and/or an aerial vehicle.

Turning to FIG. 3D, the example marker arrangement 330 is shown, the example arrangement 330 includes multiple converging triangle portions 332. While two of the converging triangle portions 332 are shown in this example, any other appropriate number converging triangle portions 332 can be implemented instead (e.g., three, four, five, . . . ten, . . . twenty, etc.).

Figure 4:
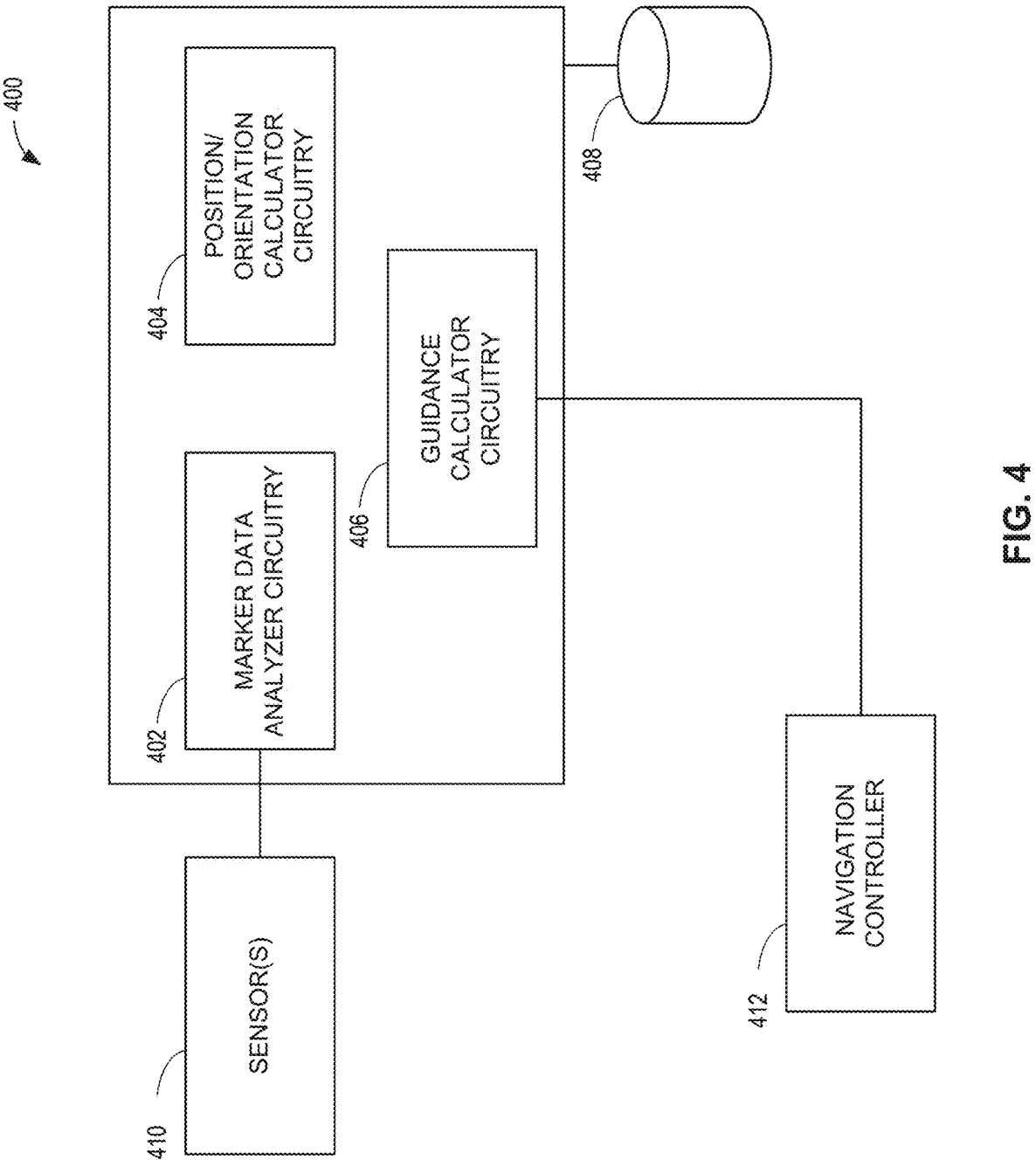
FIG. 4 depicts an example subterranean guidance analysis system in accordance with teachings of this disclosure.

FIG. 4 is a block diagram of an example implementation of an example subterranean guidance analysis system 400 to guide a vehicle (e.g., the vehicle 101, the vehicle 130, etc.). The subterranean guidance analysis system 400 of FIG. 4 may be instantiated (e.g., creating an instance of, bring into being for any length of time, materialize, implement, etc.) by programmable circuitry such as a Central Processor Unit (CPU) executing first instructions. Additionally or alternatively, the subterranean guidance analysis system 400 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

The subterranean guidance analysis system 400 of the illustrated example includes example marker data analyzer circuitry 402, example position calculator circuitry 404, example guidance calculator circuitry 406, and example data storage 408. According to examples disclosed herein, the subterranean guidance analysis system 400 includes and/or is communicatively coupled to a sensor 410, which can be implemented in the sensor 112 or the sensor 132 of FIG. 1 and a navigation controller 412, which can be implemented in the navigation controller 114 or the navigation controller 134 of FIG. 1. In some examples, the subterranean guidance analysis system 400 is implemented in the navigation controller 114 or the navigation controller 134 of FIG. 1. In this example, the sensor 132 is carried by a vehicle (e.g., the vehicle 101, the vehicle 130) that is being guided toward a landing site/area based on subterranean markers. In other examples, the vehicle is guided away from the landing site/area based on the subterranean markers.

In the illustrated example of FIG. 4, the marker data analyzer circuitry 402 is implemented to analyze, process and/or characterize data from the sensor 410, which is a GPR sensor in this example. For example, the marker data analyzer circuitry 402 determines signal strengths of at least one subterranean marker, distinguishes different detected markers and/or determines a presence of at least one subterranean marker. In some examples, the marker data analyzer circuitry 402 determines whether a subterranean marker is correctly identified (e.g., not a false reading of a subterranean marker). In some examples, the marker data analyzer circuitry 402 is instantiated by programmable circuitry executing marker data analyzer instructions and/or configured to perform operations such as those represented by the flowchart of FIG. 5.

In this example, the position calculator circuitry 404 determines a position, a relative position, an orientation and/or a heading of the vehicle with respect to at least one subterranean marker. According to examples disclosed herein, the position calculator circuitry 404 utilizes signal strengths of at least one subterranean marker to calculate a relative position, heading, height and/or displacement between the vehicle and the at least one subterranean marker. In some examples, the position calculator circuitry 404 identifies a pattern of subterranean markers to determine information corresponding to a landing area/site (e.g., a runway, a taxiing area, a vertiport, etc.). For example, the pattern of subterranean markers can be utilized to identify an autonomous action to perform, a turning area, a stopping area, a path to follow, an approach direction/vector, a landing area size/length, approach parameters, location information, at least one designated marker identifier, etc. Additionally, or alternatively, the pattern can convey a shape and/or geometry of an arrangement of subterranean markers that guides movement of the vehicle (e.g., a reticle, a converging shape, etc.). In some examples, the position calculator circuitry 404 is instantiated by programmable circuitry executing position calculator instructions and/or configured to perform operations such as those represented by the flowchart of FIG. 5.

According to some examples disclosed herein, the guidance calculator circuitry 406 is implemented to guide and/or direct movement of the vehicle based on at least one subterranean marker and/or a position of a subterranean marker. According to some examples disclosed herein, the guidance calculator circuitry 406 can guide the vehicle to hover over or move toward a destination area (e.g., a landing area and/or a landing target prior to a final vertical descent). In some examples, the guidance calculator circuitry 406 is instantiated by programmable circuitry executing guidance calculator instructions and/or configured to perform operations such as those represented by the flowchart of FIG. 5.

In some examples, the data storage 408 is implemented to store data pertaining to marker pattern information, marker arrangement information, marker indications, known marker spatial information, marker shape information, etc. The data can be utilized for subterranean marker pattern recognition and/or to determine guidance information (e.g., a stop location, a turn location, etc.) corresponding to the subterranean markers.

While an example manner of implementing the subterranean guidance analysis system 400 of FIG. 1 is illustrated in FIG. 4, one or more of the elements, processes, and/or devices illustrated in FIG. 4 may be combined, divided, re-arranged, omitted, eliminated, and/or implemented in any other way. Further, the example marker data analyzer circuitry 402, the example position calculator circuitry 404, the example guidance calculator circuitry 406, and/or, more generally, the example subterranean guidance analysis system 400 of FIG. 4, may be implemented by hardware alone or by hardware in combination with software and/or firmware. Thus, for example, any of the example marker data analyzer circuitry 402, the example position calculator circuitry 404, the example guidance calculator circuitry 406, and/or, more generally, the example subterranean guidance analysis system 400, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s)

(PLD(s)), and/or field programmable logic device(s) (FPLD (s)) such as FPGAs. Further still, the example subterranean guidance analysis system 400 of FIG. 4 may include one or more elements, processes, and/or devices in addition to, or instead of, those illustrated in FIG. 4, and/or may include more than one of any or all of the illustrated elements, processes and devices.

Figure 5:
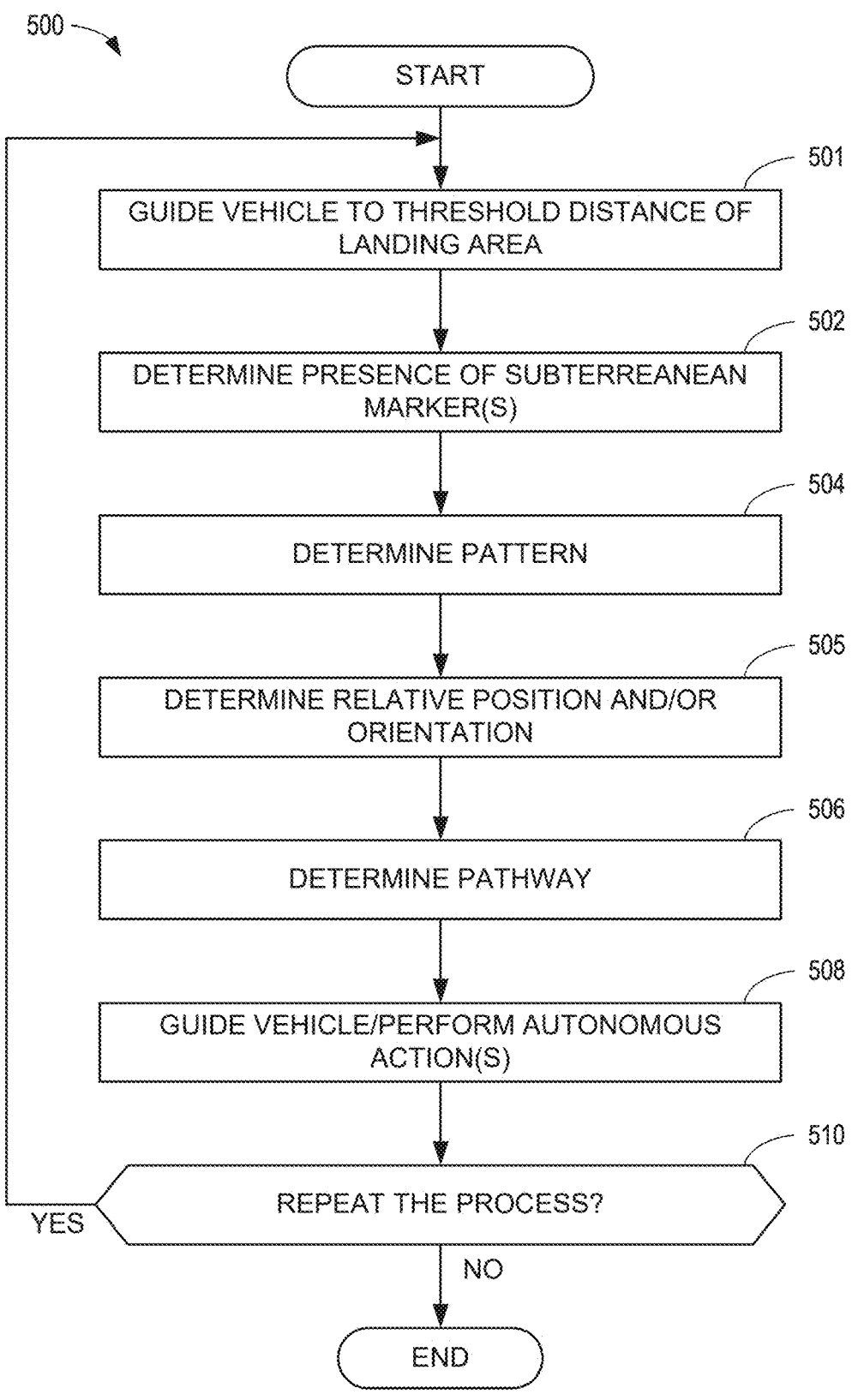
FIG. 5 is a flowchart representative of example machine-readable instructions and/or example operations that may be executed, instantiated, and/or performed by example programmable circuitry to implement the subterranean guidance analysis system of FIG. 4.

A flowchart representative of example machine-readable instructions, which may be executed by programmable circuitry to implement and/or instantiate the subterranean guidance analysis system 400 of FIG. 4 and/or representative of example operations which may be performed by programmable circuitry to implement and/or instantiate the subterranean guidance analysis system 400 of FIG. 4, is shown in FIG. 5. The machine-readable instructions may be one or more executable programs or portion(s) of one or more executable programs for execution by programmable circuitry such as the programmable circuitry 612 shown in the example processor platform 600 discussed below in connection with FIG. 6 and/or may be one or more function (s) or portion(s) of functions to be performed by the example programmable circuitry (e.g., an FPGA) discussed below in connection with FIGS. 7 and/or 8. In some examples, the machine-readable instructions cause an operation, a task, etc., to be carried out and/or performed in an automated manner in the real world.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 5, many other methods of implementing the example subterranean guidance analysis system 400 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

FIG. 5 is a flowchart representative of example machine-readable instructions and/or example operations 500 that may be executed, instantiated, and/or performed by programmable circuitry to guide a vehicle (e.g., the vehicle 101, the vehicle 130) based on subterranean markers (e.g., subterranean markers with a defined density and/or density range to be detected by a GPS sensor of the vehicle). The example machine-readable instructions and/or the example operations 500 of FIG. 5 begin at block 501, at which the example guidance calculator circuitry 406 guides the vehicle to a position that is within a threshold distance of an arrival area, a destination, a landing area, a site, or target. Examples disclosed herein can augment an existing navigation system (e.g., for increased precision) or autonomous guidance system. In some implementations, examples disclosed herein can be transitioned to or from, and/or backup an existing navigation/autonomous guidance system. For example, upon reaching a position within the threshold distance, the vehicle may switch to a mode to seek and/or identify subterranean markers. In other words, the vehicle can be directed to utilize subterranean markers in response to being within the threshold distance of the landing area, site, or target.

At block 502, the example marker data analyzer circuitry 402 determines a presence of and/or detects subterranean markers. The presence of the subterranean markers may be determined based on signal strengths thereof. Additionally or alternatively, the marker data analyzer circuitry 402 determines spacing between at least two subterranean markers (e.g., two adjacent subterranean markers).

At block 504, in some examples, the marker data analyzer circuitry 402 determines a pattern of the subterranean markers. In some such examples, the pattern can correspond to a pathway, landing site or other area parameters, landing site or other area information, a landing site or other area identifier, and/or an approach or pathway vector/direction, etc. Additionally or alternatively, the pattern can indicate an area to turn, stop, etc. Further, in some examples, a missing subterranean marker can cause certain autonomous behavior and/or activity of the vehicle, such as stopping, calling a fueler to fuel the vehicle, etc.

At block 505, according to examples disclosed herein, the marker data analyzer circuitry 402 and/or the position calculator circuitry 404 determines a position of the vehicle relative to at least one subterranean marker. This determination may be based on a signal strength associated with the at least one subterranean marker. Additionally or alternatively, the marker data analyzer circuitry 402 and/or the position calculator circuitry 404 determines a heading, orientation, an attitude, and/or a distance to at least one subterranean marker. According to some examples disclosed herein, the marker data analyzer circuitry 402 and/or the position calculator circuitry 404 utilizes a known spatial relationship (e.g., known spacing, known distances, known variations in spacing, etc.) between at least two subterranean markers to determine the position, heading, orientation and/or distance between the vehicle and the subterranean markers. In some examples, an alignment, attitude and/or heading of the vehicle with respect to destination, such as a landing area or other area/site associated with the subterranean markers, is determined by the marker data analyzer circuitry 402 and/or the position calculator circuitry 404.

At block 506, in some examples, the position calculator circuitry 404 determines a pathway. In some such examples, the position calculator circuitry 404 determines the pathway based on the pattern. The pathway may correspond to turning locations, a path to follow, a location to turn toward, etc. For the example of a ground-based vehicle, the vehicle may autonomously follow the path.

At block 508, the example guidance calculator circuitry 406 guides the vehicle based on a relative position, distance, orientation and/or heading corresponding to at least one subterranean marker and/or causes an autonomous action to be performed by the vehicle. In some examples, the guidance calculator circuitry 406 follows a pathway defined by the at least one subterranean marker. Additionally or alternatively, the example guidance calculator circuitry 406 utilizes GPS data in conjunction with GPR measurements and/or data. Additionally or alternatively, the example guidance calculator circuitry 406 causes the vehicle to perform autonomous actions including, but not limited to, autonomous guidance, navigation, behaviors, turning, stopping, triggering refueling, etc.

At block 510, it is determined by the example guidance calculator circuitry 406 whether to repeat the process. If the process is to be repeated (block 510), control of the process returns to block 501. Otherwise, the process ends. The determination to repeat the process may be based on whether the vehicle necessitates further guidance, for example.

Figure 6:
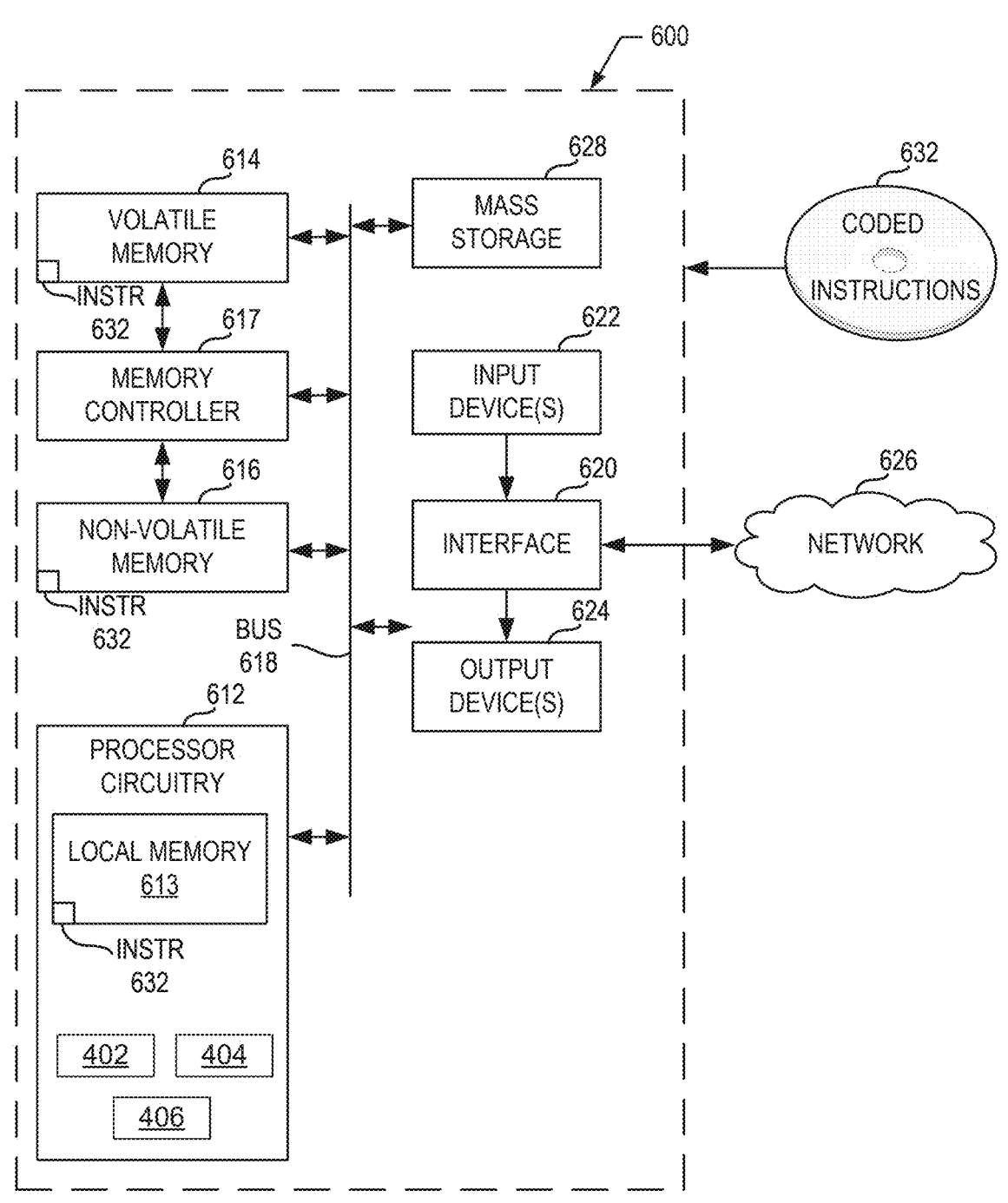
FIG. 6 is a block diagram of an example processing platform including programmable circuitry structured to execute, instantiate, and/or perform the example machine-readable instructions and/or perform the example operations of FIG. 5 to implement the subterranean guidance analysis system of FIG. 4.

FIG. 6 is a block diagram of an example programmable circuitry platform 600 structured to execute and/or instantiate the example machine-readable instructions and/or the example operations of FIG. 5 to implement the subterranean guidance analysis system 400 of FIG. 4. The programmable circuitry platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example marker data analyzer circuitry 402, the example position calculator circuitry 404, and the example guidance calculator circuitry 406.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 632, which may be implemented by the machine-readable instructions of FIG. 5, may be stored in the mass storage device 628, in the volatile memory 614, in the non-volatile memory 616, and/or on at least one non-transitory computer readable storage medium such as a CD or DVD which may be removable.

Figure 7:
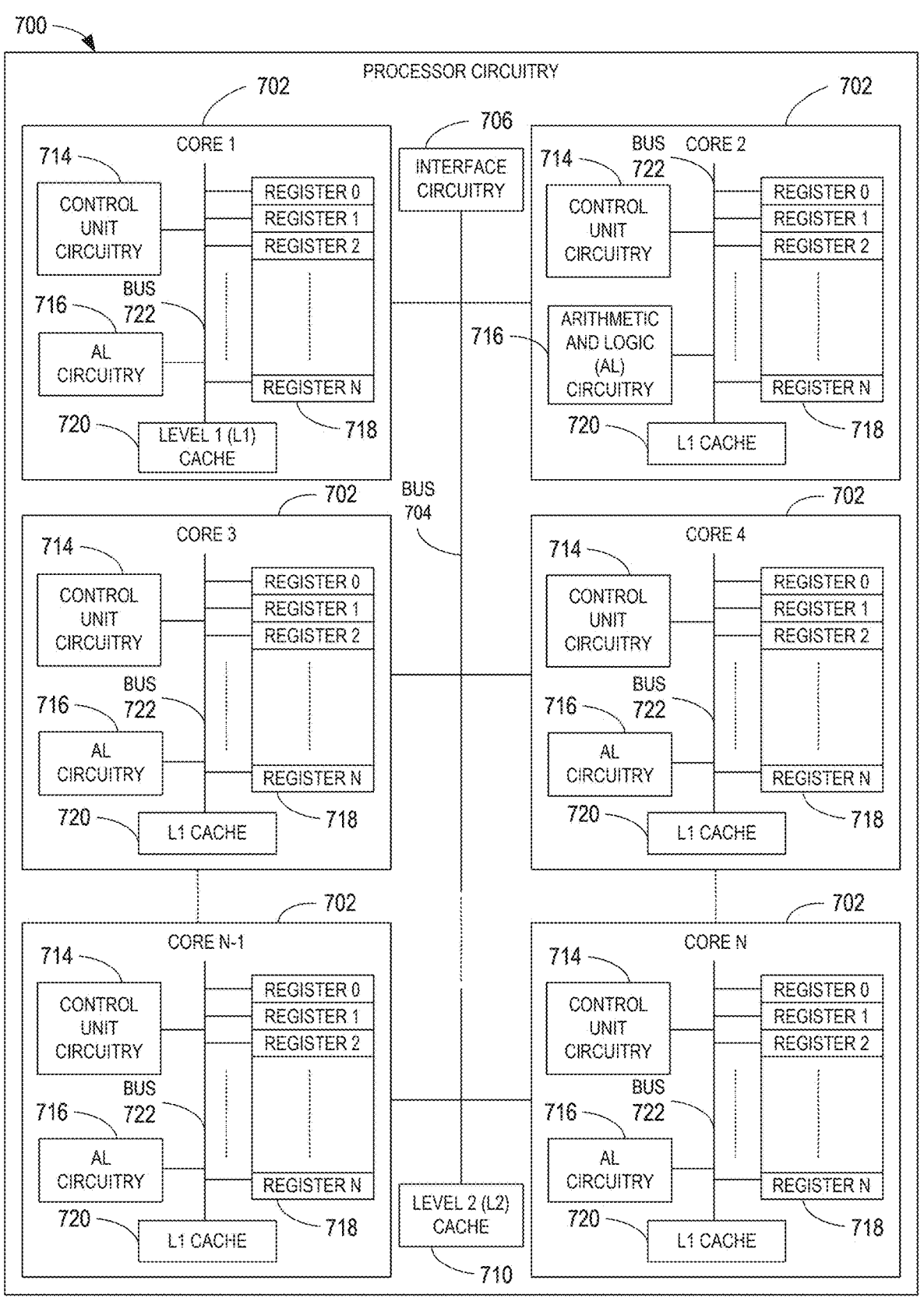
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowchart of FIG. 5 to effectively instantiate the circuitry of FIG. 2 as logic circuits to perform operations corresponding to those machine-readable instructions. In some such examples, the circuitry of FIG. 4 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine-readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine-readable instructions and/or operations represented by the flowchart of FIG. 5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
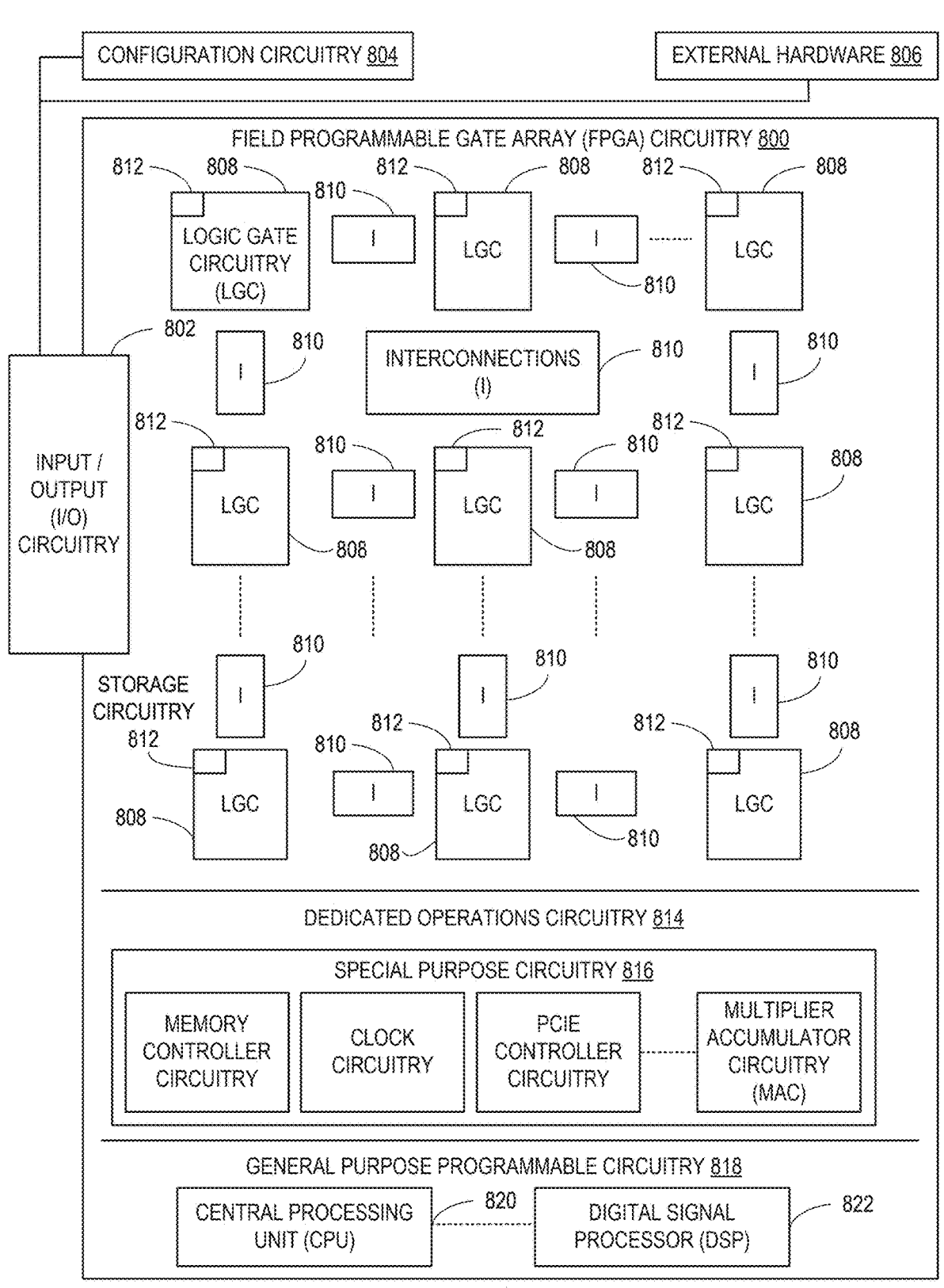
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine-readable instructions. However, once configured, the FPGA circuitry 800 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine-readable instructions represented by the flowchart of FIG. 5 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine-readable instructions represented by the flowchart of FIG. 5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 5. As such, the FPGA circuitry 800 may be configured and/or structured to effectively instantiate some or all of the operations/functions corresponding to the machine-readable instructions of the flowchart of FIG. 5 as dedicated logic circuits to perform the operations/functions corresponding to those software instructions in a dedicated manner analogous to an ASIC. Therefore, the FPGA circuitry 800 may perform the operations/functions corresponding to the some or all of the machine-readable instructions of FIG. 5 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812.

The logic gate circuitry 808 and the configurable interconnections 810 are configurable to instantiate one or more operations/functions that may correspond to at least some of the machine-readable instructions of FIG. 5 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, OR gates, NOR gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine-readable instructions represented by the flowchart of FIG. 5 to perform first operation(s)/function(s), the FPGA circuitry 800 of FIG. 8 may be configured and/or structured to perform second operation(s)/function(s) corresponding to a second portion of the machine-readable instructions represented by the flowchart of FIG. 5, and/or an ASIC may be configured and/or structured to perform third operation(s)/function(s) corresponding to a third portion of the machine-readable instructions represented by the flowchart of FIG. 5.

It should be understood that some or all of the circuitry of FIG. 4 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 4 may be instantiated, for example, in one or more threads executing concurrently and/or in series. For example, the microprocessor 700 of FIG. 7 may execute machine-readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 4 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

Example methods, apparatus, systems, and articles of manufacture to enable subterranean marker-based guidance are disclosed herein. Further examples and combinations thereof include the following:

Example 1 includes an apparatus to guide a vehicle, the apparatus comprising interface circuitry communicatively coupled to a ground penetrating sensor supported by the vehicle, machine-readable instructions, and at least one processor circuit to be programmed by the machine-readable instructions to calculate, based on output from the ground penetrating sensor, a position of the vehicle relative to a subterranean marker, and guide movement of the vehicle at least partially based on the position of the vehicle relative to the subterranean marker.

Example 2 includes the apparatus as defined in example 1, wherein the subterranean marker is a first subterranean marker and the position is a first position, and wherein one or more of the at least one processor circuit is to calculate a second position of the vehicle relative to a second subterranean marker.

Example 3 includes the apparatus as defined in example 2, wherein one or more of the at least one processor circuit is to identify a pattern based on the first and second subterranean markers, and wherein the movement of the vehicle is guided based on the pattern.

Example 4 includes the apparatus as defined in any of examples 2 or 3, wherein the position of the vehicle relative to a location is calculated based on a known spatial relationship between the first and second subterranean markers.

Example 5 includes the apparatus as defined in any of examples 1 to 3, wherein the vehicle is an aircraft.

Example 6 includes the apparatus as defined in any of examples 1 to 5, wherein one or more of the at least one processor circuit is to calculate at least one of an attitude of the vehicle or an alignment of the vehicle.

Example 7 includes the apparatus as defined in any of examples 1 to 6, wherein the vehicle is a ground-based vehicle.

Example 8 includes the apparatus as defined in any of examples 1 to 7, wherein one or more of the at least one processor circuit is to calculate the position of the vehicle relative to the subterranean marker in response to a GNSS signal guiding the vehicle to a threshold distance from a destination area being lost or interrupted.

Example 9 includes a non-transitory machine-readable storage medium comprising instructions to cause at least one processor circuit to at least calculate, based on output from a ground penetrating sensor carried by a vehicle, a position of the vehicle relative to a subterranean marker, and guide movement of the vehicle or perform an autonomous action based on the position of the vehicle relative to the subterranean marker.

Example 10 includes the non-transitory machine-readable storage medium as defined in example 9, wherein the subterranean marker is a first subterranean marker and the position is a first position, and wherein the instructions cause one or more of the at least one processor circuit to calculate a second position of the vehicle relative to a second subterranean marker.

Example 11 includes the non-transitory machine-readable storage medium as defined in example 10, wherein the instructions cause one or more of the at least one processor circuit to identify a pattern based on the first and second subterranean markers, and wherein the movement of the vehicle is guided based on the pattern.

Example 12 includes the non-transitory machine-readable storage medium as defined in example 11, wherein the pattern defines a pathway of the vehicle.

Example 13 includes the non-transitory machine-readable storage medium as defined in any of examples 10 to 11, wherein the instructions cause one or more of the at least one processor circuit to calculate the position of the vehicle based on a known spatial relationship between the first and second subterranean markers.

Example 14 includes the non-transitory machine-readable storage medium as defined in any of examples 9 to 13, wherein the instructions cause one or more of the at least one processor circuit to calculate at least one of an attitude of the vehicle or an alignment of the vehicle.

Example 15 includes the non-transitory machine-readable storage medium as defined in any of examples 9 to 14, wherein the instructions cause one or more of the at least one processor circuit to calculate the position further based on a GNSS signal.

Example 16 includes a method comprising calculating, by executing instructions with at least one processor circuit, a position of a vehicle relative to a subterranean marker based on output from a ground penetrating sensor carried by a vehicle, and guiding, by executing instructions with one or more of the at least one processor circuit, movement of the vehicle based on the position of the vehicle relative to the subterranean marker.

Example 17 includes the method as defined in example 16, wherein the subterranean marker is a first subterranean marker and the position is a first position, and further including calculating, by executing instructions with one or more of the at least one processor circuit, a second position of the vehicle relative to a second subterranean marker.

Example 18 includes the method as defined in example 17, further including identifying, by executing instructions with one or more of the at least one processor circuit, a pattern based on the first and second subterranean markers, wherein the movement of the vehicle is guided based on the pattern.

Example 19 includes the method as defined in example 18, wherein the pattern defines a pathway of the vehicle.

Example 20 includes the method as defined in any of examples 17 to 19, further including calculating a position of the vehicle based on a known spatial relationship between the first and second subterranean markers.

From the foregoing, it will be appreciated that example systems, apparatus, articles of manufacture, and methods have been disclosed that enable effective ground-based navigation and guidance of vehicles with subterranean markers. Examples disclosed herein are cost effective and can be implemented in a relatively quick manner. Examples disclosed herein can reduce human oversight and necessitated infrastructure. Examples disclosed herein can also augment, offset, offload, backup and/or supplement existing navigation/guidance implementations.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to guide a vehicle an aircraft, the apparatus comprising:
  interface circuitry communicatively coupled to a ground penetrating sensor supported by the aircraft;
  machine-readable instructions; and
    at least one programmable circuitry to be programmed by the machine-readable instructions to:

calculate, based on output from the ground penetrating sensor, a position of the aircraft relative to a subterranean marker, and
      cause movement of the aircraft at least partially based on the position of the aircraft relative to the subterranean marker.

2. The apparatus as defined in claim 1, wherein the subterranean marker is a first subterranean marker and the position is a first position, and wherein one or more of the at least one programmable circuitry is to calculate a second position of the aircraft relative to a second subterranean marker.

3. The apparatus as defined in claim 2, wherein one or more of the at least one is to identify a pattern based on the first and second subterranean markers, and wherein the movement of the aircraft is guided based on the pattern.

4. The apparatus as defined in claim 2, wherein the position of the aircraft relative to a location is calculated based on a known spatial relationship between the first and second subterranean markers.

5. The apparatus as defined in claim 4, wherein one or more of the at least one programmable circuitry is to identify an area of ground based on the known spatial relationship.

6. The apparatus as defined in claim 1, wherein one or more of the at least one programmable circuitry is to calculate at least one of an attitude of the aircraft or an alignment of the aircraft.

7. The apparatus as defined in claim 1, wherein one or more of the at least one programmable circuitry is to calculate the position of the aircraft relative to the subterranean marker in response to a GNSS signal guiding the aircraft to a threshold distance from a destination area being lost or interrupted.

8. The apparatus as defined in claim 1, wherein the aircraft is controlled for landing or takeoff based on the position of the aircraft relative to the subterranean marker.

9. A non-transitory machine-readable storage medium comprising instructions to cause at least one programmable circuitry to at least:
  calculate, based on output from a ground penetrating sensor carried by an aircraft, a position of the aircraft relative to a subterranean marker, and
  control movement of the aircraft or perform an autonomous action based on the position of the aircraft relative to the subterranean marker.

10. The non-transitory machine-readable storage medium as defined in claim 7, wherein the subterranean marker is a first subterranean marker and the position is a first position, and wherein the instructions cause one or more of the at least one programmable circuitry to calculate a second position of the aircraft relative to a second subterranean marker.

11. The non-transitory machine-readable storage medium as defined in claim 8, wherein the instructions cause one or more of the at least one programmable circuitry to identify a pattern based on the first and second subterranean markers, and wherein the movement of the aircraft is guided based on the pattern.

12. The non-transitory machine-readable storage medium as defined in claim 9, wherein the pattern defines a pathway of the aircraft.

13. The non-transitory machine-readable storage medium as defined in claim 8, wherein the instructions cause one or more of the at least one programmable circuitry to calculate the position of the aircraft based on a known spatial relationship between the first and second subterranean markers.

14. The non-transitory machine-readable storage medium as defined in claim 7, wherein the instructions cause one or more of the at least one programmable circuitry to calculate at least one of an attitude of the aircraft or an alignment of the aircraft.

15. The non-transitory machine-readable storage medium as defined in claim 7, wherein the instructions cause one or more of the at least one programmable circuitry to calculate the position further based on a GNSS signal.

16. A method comprising:

calculating, by executing instructions with at least one programmable circuitry, a position of an aircraft relative to a subterranean marker based on output from a ground penetrating sensor carried by an aircraft, and guiding, by executing instructions with one or more of the at least one programmable circuitry, movement of the aircraft based on the position of the aircraft relative to the subterranean marker.

17. The method as defined in claim 14, wherein the subterranean marker is a first subterranean marker and the position is a first position, and further including calculating, by executing instructions with one or more of the at least one programmable circuitry, a second position of the aircraft relative to a second subterranean marker.

18. The method as defined in claim 15, further including identifying, by executing instructions with one or more of the at least one programmable circuitry, a pattern based on the first and second subterranean markers, and wherein the movement of the aircraft is guided based on the pattern.

19. The method as defined in claim 16, wherein the pattern defines a pathway of the aircraft.

20. The method as defined in claim 15, further including calculating a position of the aircraft based on a known spatial relationship between the first and second subterranean markers.

\* \* \* \* \*